US012583537B2

(12) United States Patent
Goto et al.

(10) Patent No.: US 12,583,537 B2
(45) Date of Patent: Mar. 24, 2026

(54) MAGNETICALLY-ATTRACTING CRAWLER MOVING DEVICE, MULTI-CONNECTED MAGNETICALLY-ATTRACTING CRAWLER MOVING DEVICE, AND GENERATOR INSPECTION ROBOT

(71) Applicant: MITSUBISHI GENERATOR CO., LTD., Kobe City (JP)

(72) Inventors: Daichi Goto, Tokyo (JP); Eiji Koyanagi, Kamakura (JP)

(73) Assignee: MITSUBISHI GENERATOR CO., LTD., Kobe City (JP)

( * ) Notice: Subject to any disclaimer, the term of this patent is extended or adjusted under 35 U.S.C. 154(b) by 437 days.

(21) Appl. No.: 18/249,080

(22) PCT Filed: Nov. 6, 2020

(86) PCT No.: PCT/JP2020/041473
§ 371 (c)(1),
(2) Date: Apr. 14, 2023

(87) PCT Pub. No.: WO2022/097256
PCT Pub. Date: May 12, 2022

(65) Prior Publication Data
US 2023/0406427 A1    Dec. 21, 2023

(51) Int. Cl.
*B62D 55/075* (2006.01)
*B62D 55/265* (2006.01)

(52) U.S. Cl.
CPC ......... *B62D 55/075* (2013.01); *B62D 55/265* (2013.01)

(58) Field of Classification Search
CPC ........................... B62D 55/075; B62D 55/265
See application file for complete search history.

(56) References Cited

U.S. PATENT DOCUMENTS

| | | | | |
|---|---|---|---|---|
| 7,624,827 B2 * | 12/2009 | Moser | ................. | B62D 55/125 |
| | | | | 305/132 |
| 2008/0308324 A1 | 12/2008 | Moser et al. | | |

(Continued)

FOREIGN PATENT DOCUMENTS

| | | | | |
|---|---|---|---|---|
| CN | 106995014 A | * | 8/2017 | ........... B62D 55/265 |
| CN | 110386198 A | * | 10/2019 | ............. B62D 55/30 |

(Continued)

OTHER PUBLICATIONS

Office Action dated Aug. 9, 2024, issued in the corresponding Canadian Patent Application No. 3,195,855, 5 pages.

(Continued)

*Primary Examiner* — Drew J Brown
(74) *Attorney, Agent, or Firm* — BUCHANAN, INGERSOLL & ROONEY PC

(57) ABSTRACT

A magnetically-attracting crawler moving device has a magnetically-attracting traveling mechanism including a source device of magnetic force provided with a pair of magnets and a yoke disposed on the backside of the magnets or behind the magnet; a crawler belt rotationally running with drive portion thereof in non-contact with the source device of magnetic force; and a guide in contact with the pair of magnets and the yoke and on which surface the crawler belt slides, wherein the drive portion of the crawler belt protrudes from the source device of magnetic force and the guide to travel.

20 Claims, 11 Drawing Sheets

(56) References Cited

U.S. PATENT DOCUMENTS

| | | | |
|---|---|---|---|
| 2016/0377424 A1 | 12/2016 | Clark | |
| 2019/0329399 A1 | 10/2019 | Mizuno et al. | |

FOREIGN PATENT DOCUMENTS

| CN | 113085542 A | * | 7/2021 | ............. | G01N 29/04 |
|---|---|---|---|---|---|
| CN | 116620437 A | * | 8/2023 | ............. | B62D 55/30 |
| CN | 117680416 A | * | 3/2024 | ............. | B08B 13/00 |
| CN | 118928570 A | * | 11/2024 | .......... | B62D 55/265 |
| JP | H03260206 A | | 11/1991 | | |
| JP | H0424181 A | | 1/1992 | | |
| JP | H09267606 A | | 10/1997 | | |
| JP | 2004148893 A | | 5/2004 | | |
| JP | 2017054486 A | | 3/2017 | | |
| NL | 2037778 A | * | 8/2024 | .......... | B62D 55/265 |
| WO | 2018134991 A1 | | 7/2018 | | |

OTHER PUBLICATIONS

Extended European Search Report dated Oct. 31, 2023, issued in the corresponding European Patent Application No. 20960809.0, 8 pages.

International Search Report (PCT/ISA/210) with translation and Written Opinion (PCT/ISA/237) mailed on Jan. 26, 2021 by the Japanese Patent Office as the International Searching Authority for International Application No. PCT/JP2020/041473. (8 pages).

\* cited by examiner

D-D cross section

E-E cross section

MAGNETICALLY-ATTRACTING CRAWLER MOVING DEVICE, MULTI-CONNECTED MAGNETICALLY-ATTRACTING CRAWLER MOVING DEVICE, AND GENERATOR INSPECTION ROBOT

TECHNICAL FIELD

The present application relates to a magnetically-attracting crawler moving device, a multi-connected magnetically-attracting crawler moving device, and a generator inspection robot.

BACKGROUND ARTS

Recently, measures against age deterioration of bridges and/or viaducts are repeatedly demanded, in particular, studies of inspection and/or maintenance means for undersides and/or vertical sides of bridges and overpasses are requested. The inspection has been performed by visual observation of undersides from below, close visual observation using a movable aerial work vehicle or the like, or visual observation using a hanging scaffold, and quite recently, utilization of a drone equipped with a photographing means is considered.

Specifically, a viaduct inspection system is proposed that includes a forward and backward movable lifting mechanism mounted on the roof of a vehicle; a horizontally bendable linkage whose base end is pivotably connected to a base mounted on the top end of the lifting mechanism; a sensor base perpendicularly movably and horizontally pivotably attracted to the top end of the linkage; a laser measurement unit supported on the sensor base and constituted with a laser scanner for upwardly scanning at a predetermined swing angle the laser beam incident from a laser head; a photosensor for detecting the amount of reflected light of the laser beam scanned by the laser scanner (refer to, for example, Patent Document 1). Moreover, an inspection drone equipped with an infrared camera is disclosed (refer to, for example, Patent Document 2).

Furthermore, a magnetic wheel is disclosed that is configured with a wheel shaft, a permanent magnet disposed around the wheel shaft, and wheels, in which a gap is formed between the permanent magnet and the wheel shaft and further non-magnetic members or weak-magnetic members are arranged at the inner radius of the wheel and ferromagnetic members are arranged at the outer radius of the wheel, whereby the magnetic wheel generates a large magnetically attracting force per volume of the permanent magnet and produces weak mechanical noise during traveling (refer to, for example, Patent Document 3)

Furthermore, a wall-attracting traveling device is disclosed as a wall inspection means that is equipped with a traveling belt on the surface of a magnet for attracting to a wall (refer to, for example, Patent Document 4). Furthermore, an attracting traveling device is disclosed that uses a magnet belt including a number of attracted magnets (refer to, for example, Patent Document 5).

Furthermore, an endless track traveling device for wall traveling is disclosed that has a traveling belt for traveling on a wall with its outer surface being in contact with the wall and a plate on the inner side of the traveling belt, i.e., on the backside of the contact-traveling surface of the traveling belt (refer to, for example, Patent Document 6).

PRIOR ART DOCUMENT

Patent Documents

Patent Document 1: JPH03-260206A
Patent Document 2: JP2017-054486A
Patent Document 3: JPH09-267606A
Patent Document 4: JPH04-024181A
Patent Document 5: JP2004-148893A
Patent Document 6: WO2018/134991A

SUMMARY OF THE INVENTION

Problem that the Invention is to Solve

The inspection means disclosed in Patent Documents 1 to 3 have complicated structures and their whole sizes are large. In the wall-attracted traveling device disclosed in Patent Document 4, since the magnet for attracting to a wall faces the wall not directly but via the traveling belt, the magnetic lines of force reach not directly the wall, thus posing a problem of reducing the magnetic force for attracting to the wall. The wall-attracted traveling device disclosed in Patent Document 5 is configured with the traveling belt for traveling a wall made of a number of magnets attracted to the whole surfaces of the traveling belt, thus raising a problem of causing the device structure to be complicated and the whole weight of the device to increase.

In the wall-attracted traveling device disclosed in Patent Document 6, the plate for pressing the traveling belt onto a traveling surface is disposed between magnets and the traveling belt in order to suppress vibration occurring when traveling a surface including holes and/or unevenness.

The present application is made to resolve the above described problems and aims at providing a magnetically-attracting crawler moving device that is lightweight and has a low height and a simple structure, and suppresses vibration due to its movement even when there are holes and/or unevenness on a wall surface where the crawler device travels.

Means for Solving the Problem

A magnetically-attracting crawler moving device disclose in the present application includes a source device of magnetic force made of a magnet or a pair of opposite polarity magnets and a yoke disposed in contact with the magnet or a pair of one yoke and other yoke disposed in contact with the magnet or the pair of magnets; a non-magnetic guide disposed so that both of sides of the guide are respectively in contact with the one yoke and the other yoke and a bottom of the guide is in contact with the magnet, or disposed so that the both sides are respectively in contact with the magnet pair and the bottom is in contact with the yoke; and a crawler belt rotationally running in non-contact with the source device of magnetic force and along the longitudinal direction of the guide.

According to the disclosure of the present application, a magnetically-attracting crawler moving device can be provided that is lightweight and has a low height and a simple structure, and suppresses vibration due to its movement even when there are holes and/or unevenness on a wall surface where the moving device travels.

DETAILED DESCRIPTION OF THE INVENTION

Embodiment 1

Figure 1:
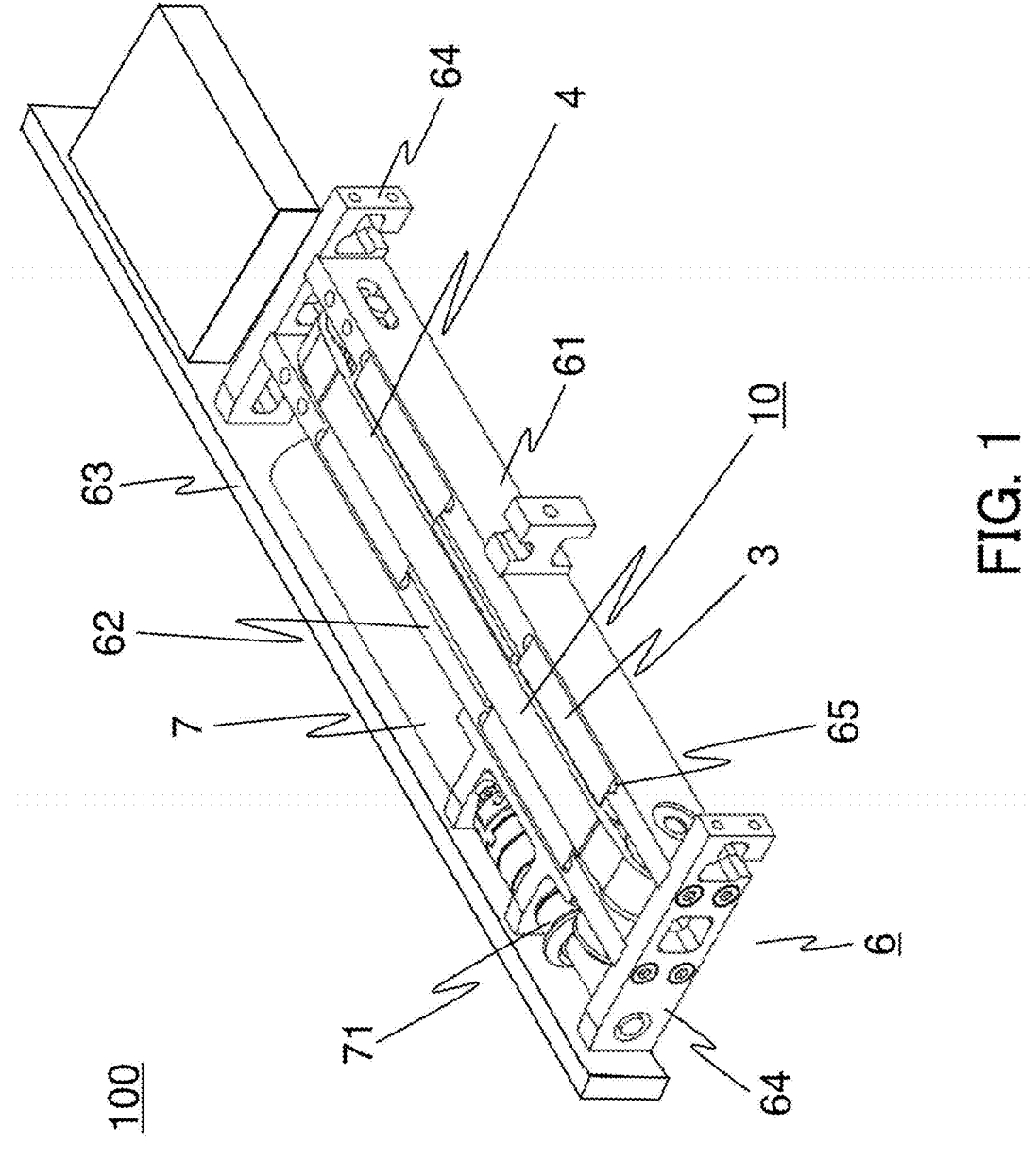
FIG. 1 is a perspective view showing an example of a magnetically-attracting crawler moving device according to Embodiment 1.

Hereinafter, a magnetic-attracting crawler moving device according to Embodiment 1 is described with reference to the drawings. FIG. 1 is a schematic view of the magnetic-attracting crawler moving device.

Referring to FIG. 1, the magnetically-attracting crawler moving device 100 includes frames 6 constituted with three parallel arranged longitudinal frames 61, 62, 63 and several transverse frames 64; a magnetically-attracting traveling mechanism 10 provided with a source device of magnetic force 3 and a crawler belt 4, placed between the two longitudinal frames 61, 62 and; a motor 7, and a driving force transmission mechanism 71 for transmitting the driving force of the motor to the source device of magnetic force, disposed between the two longitudinal frames 62, 63; In addition, by increasing the number of longitudinal frames or transverse frames, mounted components can be increased with the height of the magnetically-attracting crawler moving device being kept.

The running manner of the magnetically-attracting traveling mechanism 10 is crawler type, and the magnetically-attracting traveling mechanism 10 is provided with the crawler belt 4 as described above. The crawler belt 4 is made of a rubber or a resin such as polyurethane and driven by a pulley. Note that it is also possible to rotate backward the crawler belt by reversing the direction of rotation. The longitudinal frames 61, 62 adjacent to the magnetically-attracting traveling mechanism 10 have notches 65 formed for mounting the source device of magnetic force 3 in accordance with the number of magnets to use (the notches are later described in detail). The frames are made of a non-magnetic material such as aluminum.

Figure 2A:
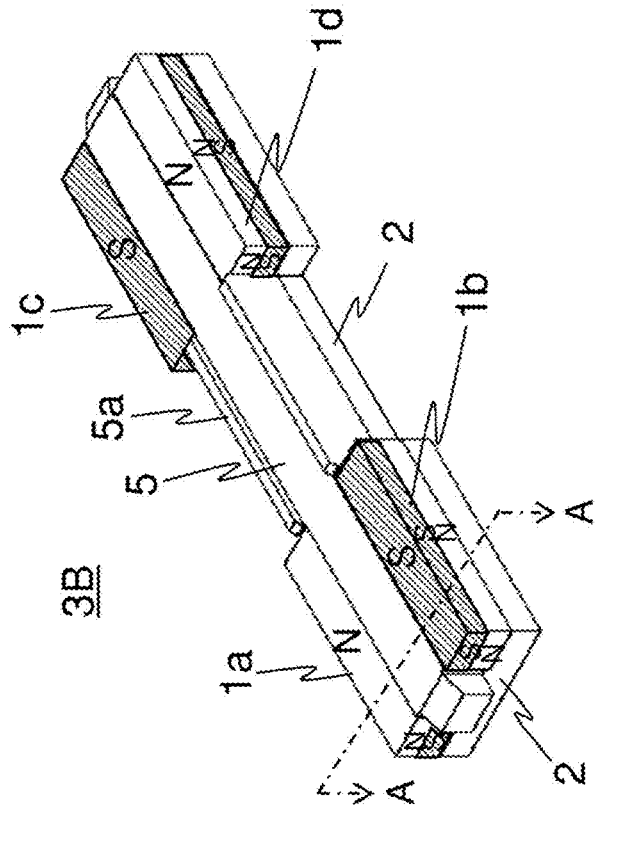
FIGS. 2A and 2B are perspective views schematically showing representative two types of a source device of magnetic force of the magnetically-attracting crawler moving device according to Embodiment 1.
Figure 2B:
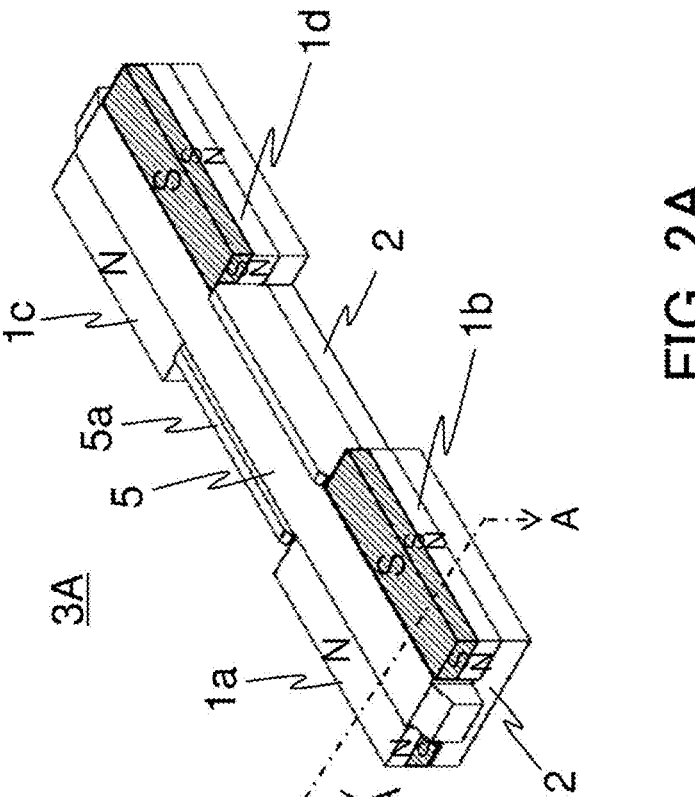
Figure 3:
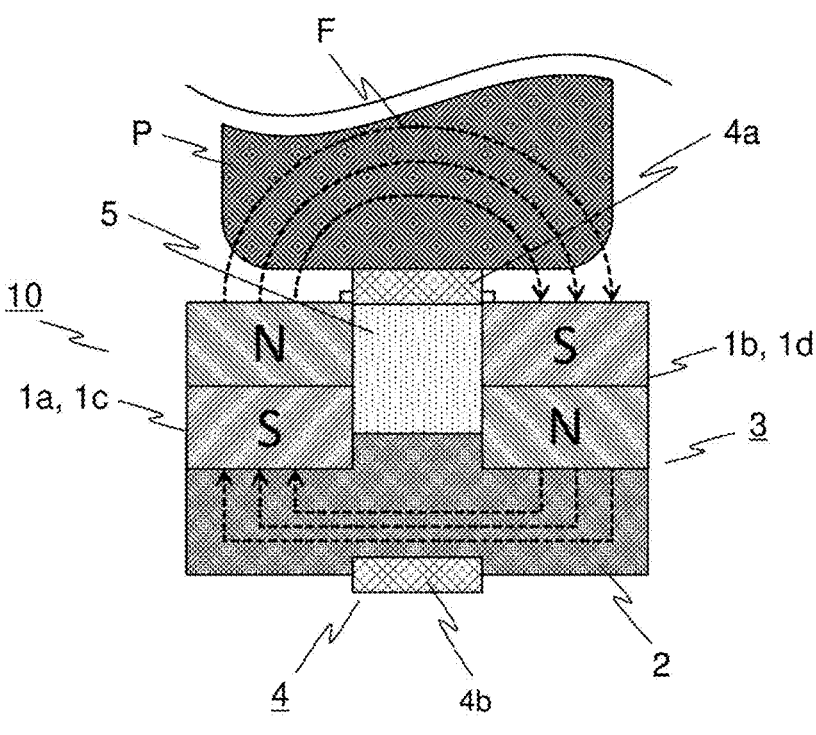
FIG. 3 is a cross-sectional view of the source device of magnetic force shown in FIG. 2A, of the magnetically-attracting crawler moving device.

The source device of magnetic force 3 used in the magnetically-attracting crawler moving device 100 is schematically shown in FIGS. 2A, 2B and FIG. 3. FIGS. 2A and 2B show perspective views of two types of the source device of magnetic force 3, and FIG. 3 shows a cross-section view thereof. Specifically, FIG. 2A is a perspective view of a source device of magnetic force 3A, and FIG. 2B is a perspective view of a source device of magnetic force 3B.

As shown in these figures, two pairs of magnets 1a, 1b and magnets 1c, 1d are arranged apart from each other; a yoke 2 is disposed on the backsides of the magnet pairs; and a guide 5 including bank edge portions 5a partially formed is sandwiched between the magnets (between the magnets 1a, 1b and between the magnets 1c, 1d). While the above describes as an example the case of arranging the two pairs of magnets, the number of magnet pairs to be arranged only needs at least one and can be appropriately determined depending on intended use. The guide 5 is made of a low friction material and acts as a sliding surface for the crawler belt. In the example shown in the figures, the bank edge portions 5a of the guide protrude upwardly to help guide straight running of the crawler belt. As for the low friction material, engineering plastic, which is a non-magnetic material, is suitable in wear resistance and lightweight. Note that the magnets 1a, 1b, 1c, 1d are collectively referred to as the magnet 1.

The source device of magnetic force 3A and the source device of magnetic force 3B, viewed from the upper side of the source device of magnetic force, differ from each other in that the source device of magnetic force 3A has the magnets of the same polarity disposed on each side of the guide whereas the source device of magnetic force 3B has the magnets of the opposite polarity disposed on each side of the guide; however, the magnets may be disposed in either arrangement.

The cross-sectional view of the source device of magnetic force in FIG. 3 depicts the crawler belt 4 in addition to the source device of magnetic force 3A shown in the perspective view of FIG. 2A. The magnets 1a, 1b are arranged apart from each other with a space for disposing the guide 5 guiding the drive portion 4a of the crawler belt, and the yoke 2 is disposed on the backside of the magnets 1a, 1b. The guide 5 including the protruding bank edge portions is disposed between the right and left magnets, and the drive portion 4a of the crawler belt runs on the surface of the guide 5. The return portion 4b of the crawler belt runs behind the yoke 2. The drive portion here means that a portion of the crawler belt run by a drive pulley (later described) provided to the magnetically-attracting traveling mechanism 10, and the return portion means a portion of the crawler belt run by a idler pulley (later described) provided to the magnetically-attracting traveling mechanism 10.

In Embodiment 1, the yoke 2 is formed to have in the middle thereof a protrusion portion including the width of the guide 5 (the width here denotes a size in the right and left direction in FIG. 3) and to have low steps for mounting the magnets 1a, 1b at the right and left. The protrusion cross section of the yoke allows the positional relationship for arranging the yoke, magnets, and the guide to be determined, and eliminates the need of other positioning members such as templates. Thus, the magnetically-attracting traveling mechanism is configured so that the drive portion of the crawler belt 4a runs protruding from the magnets 1a, 1b, 1c, 1d not to be brought into contact with an object P to which the crawler device is to attract (the object here is also parts to be inspected). Furthermore, the configuration of the magnets and the yoke concentrates the magnetic flux between the right and left magnets, whereby a strong attracting force is generated at the upper surface of the drive portion 4a of the crawler belt. No strong magnetic flux generates in the surroundings except for the upper surface.

Figures 4A, 4B, 4C:
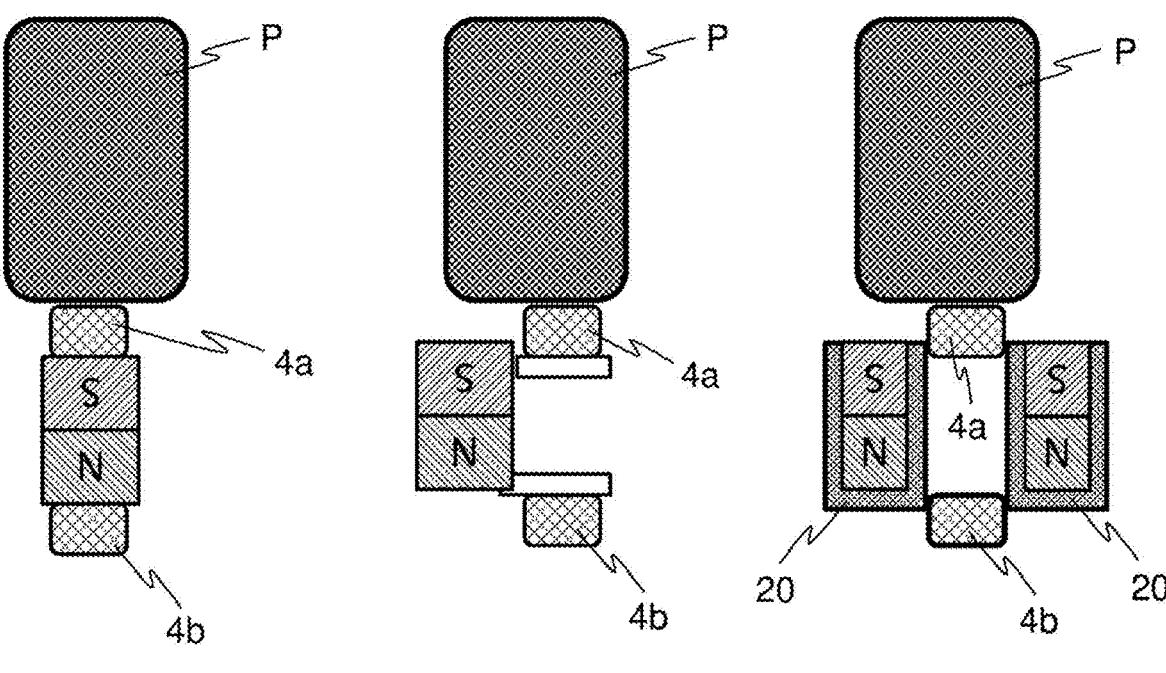
FIGS. 4A, 4B, and 4C are diagrams for explaining the action of the source device of magnetic force of the magnetically-attracting crawler moving device.

The reason for thus configuring the source device of magnetic force is described in further detail with reference to FIGS. 4A, 4B, and 4C. In a case of providing no yoke in the source device of magnetic force and configuring the magnets and the crawler belt as shown in FIG. 4A, if the source device of magnetic force becomes slightly apart from the object to which the crawler device is to attract, the attracting force decreases sharply because of a large leakage flux (not shown; the same applies below). Moreover, since the magnets and the crawler belt are arranged parallel, the crawler device increases in height as a whole.

Also in a case of providing no yoke in the source device of magnetic force and configuring the magnets and crawler belt as shown in FIG. 4B, if the source device of magnetic force becomes slightly apart from the object to which the crawler device is to attract, the attracting force decreases sharply because of a large leakage flux as with the above.

Even in a case of providing yokes 20 in the source device of magnetic force and configuring the magnets and the drive portion 4a and the return portion 4b of the crawler belt 4 as shown in FIG. 4C, specifically, even in the case of arranging right and left the magnets with a small inter-distance and arranging the yokes 20 respectively on right and left of the magnets, the percentage of leakage flux tends to increase compared with the arrangement shown in FIG. 3.

Hence, in order to efficiently utilize even the leakage flux described in FIGS. 4A to 4C as the force for attracting the crawler device to the object to which the crawler device is to attract, the configuration shown in FIG. 3 rather than those such as shown in FIGS. 4A to 4C needs to be employed for the source device of magnetic force.

A well-known permanent magnet, such as, for example, a rare-earth magnet, a ferrite magnet, an alnico magnet, and a Mn—Al—C magnet, is used for the magnet. As the rare-earth magnet, an R—Fe—B based magnet, an R—Co$_5$ based magnet, or an R$_2$—Co$_{17}$ based magnet (R stands for one or two more kind of rare-earth elements containing Y (yttrium)) can be used. For example, an R—Fe—B based permanent magnet (R stands for one or more kinds of rare-earth element such as Nd, Pr) can be used. The R—Fe—B based permanent magnet is, for example, a neodymium permanent magnet, a samarium-cobalt permanent magnet, or the like.

A well-known soft magnetic material is used for the yoke. For example, such a material includes a well-known steel material such as pure iron, soft iron, and carbon steel, or a low-alloy steel such as ordinary steel, special structural steel, tool steel, and stainless steel such as ferritic or martensitic stainless steel; and also includes a well-known ferrous casting such as cast iron and cast steel. A well-known soft ferrite material such as Mn—Zn based ferrite, a Fe—Ni based alloy such as permalloy, a Fe—Ni—Co based alloy containing cobalt and the like, and a bond-type soft magnetic material that is made by bonding powder of these well-known soft magnetic material with thermoplastic resin or thermosetting resin can also be used.

A low-friction engineering plastic to be used for the guide includes Polyoxymethylene (POM), poly butylene terephthalate (PBT), polyphenylene sulfide (PPS), Poly Tetra Fluoro Ethylene (PTPE), tetrafluoroethylene-hexafluoropropylene copolymer (EXTRUDING FEP POWDER; Fluorinated ethylene-propylene resin), and the like.

Figures 5A, 5B, 5C, 5D:
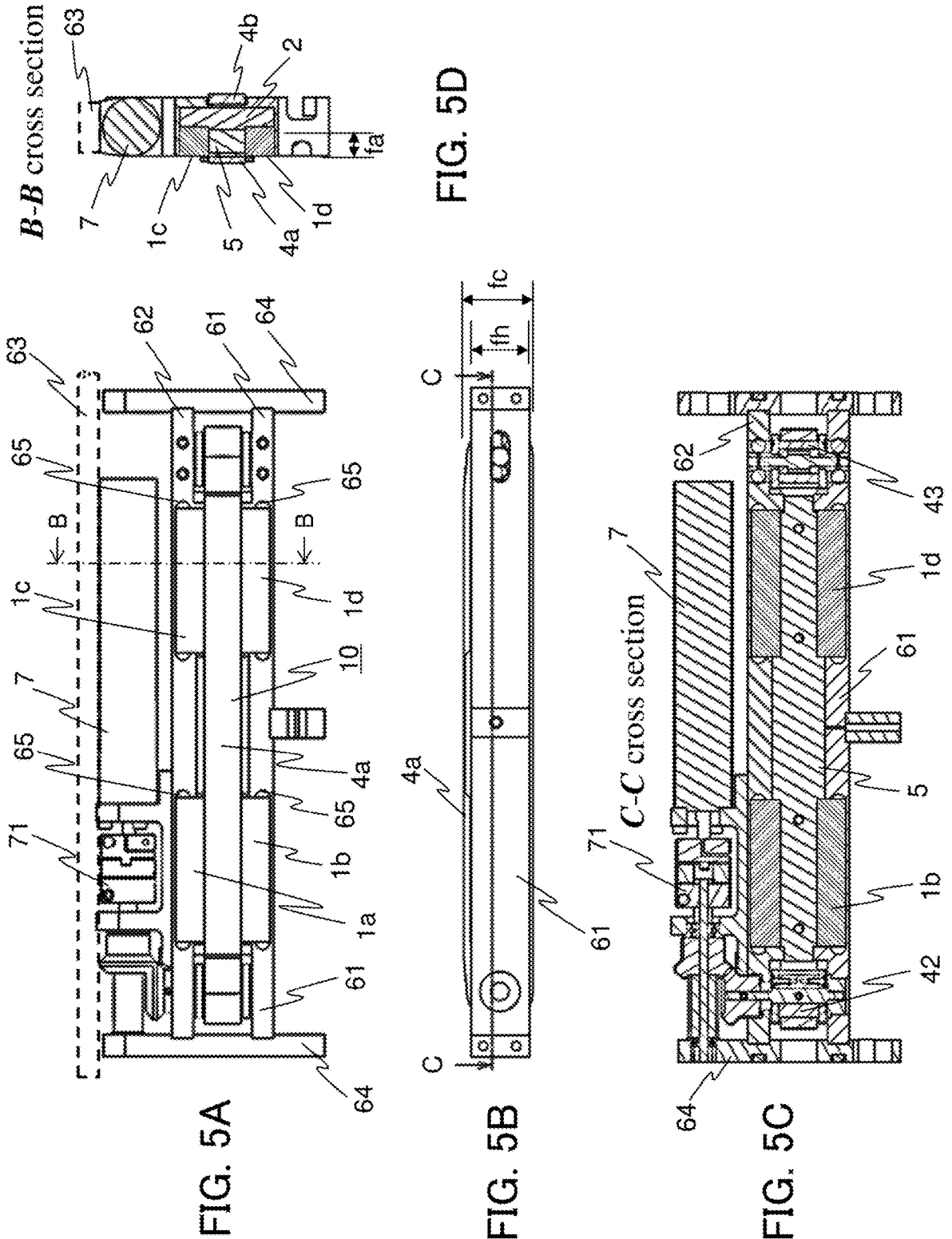
FIGS. 5A, 5B, 5C, and 5D are views showing an example of a component configuration of the magnetically-attracting crawler moving device according to Embodiment 1.

FIGS. 5A, 5B, 5C, and 5D show an example of a component configuration of the magnetically-attracting crawler moving device 100. FIG. 5A is a plan view showing the example of the component configuration of the magnetically-attracting crawler moving device 100; FIG. 5B is a side view thereof; FIG. 5C is a cross-sectional view taken along the line C-C of FIG. 5B; and FIG. is a cross-sectional view taken along the line B-B of FIG. 5A. FIGS. 5A, 5B, 5C, and 5D are views shown by consolidating the schematic views of the components shown in FIG. 1, FIGS. 2A, 2B and FIG. 3, in which the detail configuration of the whole crawler device is shown.

The frames 6 of the magnetically-attracting crawler moving device 100 are constituted with the three longitudinal frames 61, 62, 63 and the transverse frames 64 shown in FIG. 5A. The magnets 1b, 1d are inserted in the notches 65 of the longitudinal frame 61, and the magnets 1a, 1c are inserted in the notches 65 of the longitudinal frame 62 positioned in the middle of the longitudinal frame 61 and longitudinal frame 63. This situation is described below in further detail with reference to FIGS. 6A, 6B, 6C, and 6D.

Figures 6A, 6B, 6C, 6D:
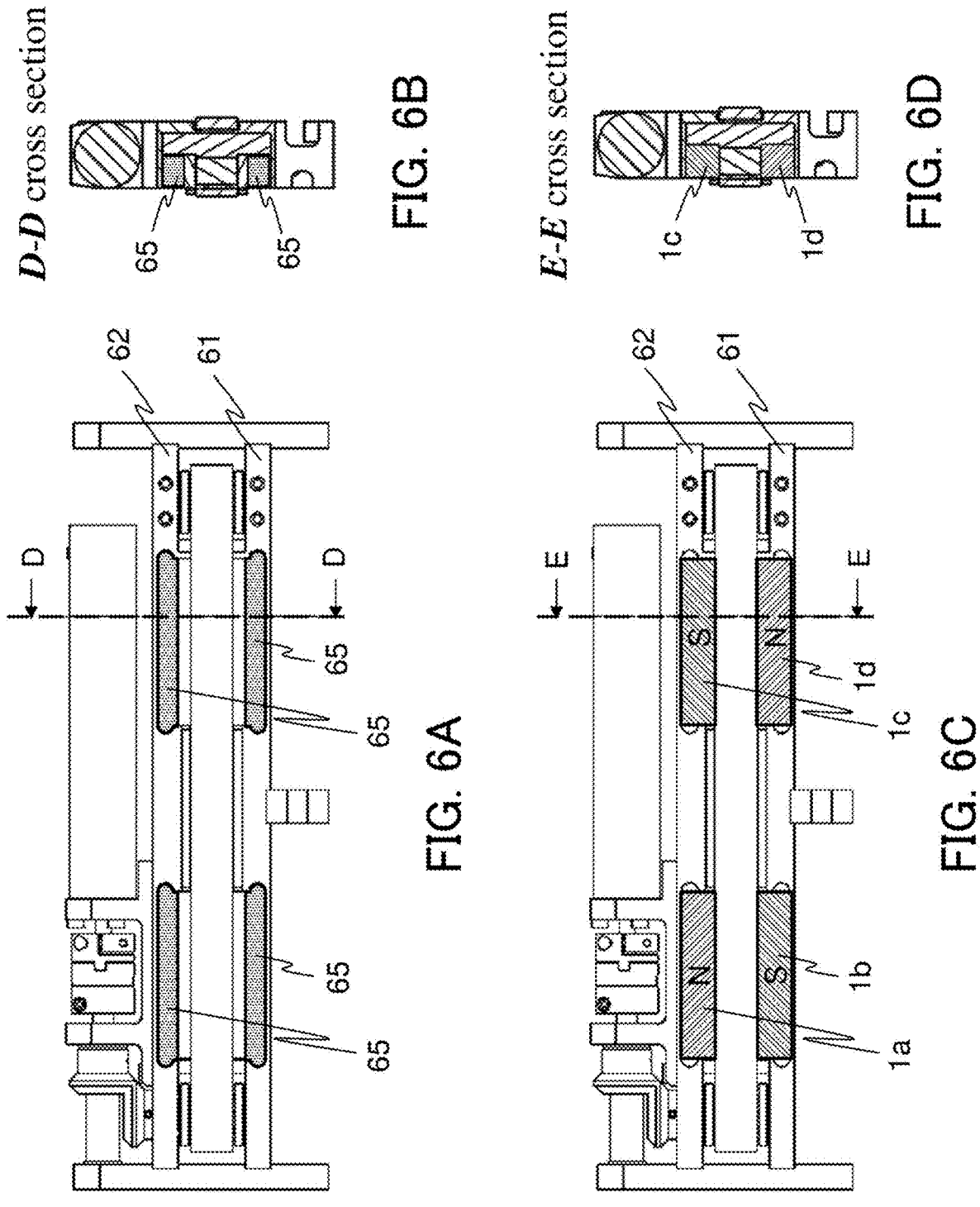
FIGS. 6A, 6B, 6C, and 6D are views for explaining notches formed in frames of the magnetically-attracting crawler moving device according to Embodiment 1.

FIGS. 6A, 6B, 6C, and 6D are views for explaining the notches formed in the frames of the magnetically-attracting crawler moving device according to Embodiment 1. FIG. 6A is a plan view showing in correspondence with FIG. 5A the positions and the shape of the notches 65 to explain the notches in detail. As shown in this figure, four oval notches are formed in accordance with the positions for arranging the magnets 1a to 1d. FIG. 6B is a cross-sectional view taken along the line D-D of FIG. 6A, showing the height-wise cross-sectional shape of the notches 65 formed in the longitudinal frames 61, 62. FIG. 6C is a plan layout of the four magnets inserted in the four notches, and FIG. 6D is a cross-sectional view taken along the line E-E of FIG. 6C.

These figures show that each of the four magnets is arranged using the above-described notches 65 with them not protruding from the outer surfaces of the longitudinal frames. Hence, This can suppress the whole size (including the height-wise size) of the magnetically-attracting crawler moving device. Then, the whole size of the magnetically-attracting crawler moving device is described specifically below referring back to FIGS. 5A, 5B, 5C, and 5D.

As shown in FIG. 5A, the magnets 1a, 1b and the magnets 1c, 1d are constituted as pairs, respectively. This figure also shows the magnetically-attracting traveling mechanism 10 interposed between the longitudinal frames 61, 62 and the drive portion 4a of the crawler belt. The side view of FIG. 5B shows the situation in which the surface of the drive portion 4a of the crawler belt protrudes slightly higher from the upper surface of the longitudinal frame 61. Specifically, in FIG. 5B, the longitudinal frame 61 have a height fh, and the upper surface of the drive portion 4a protrudes from the upper surface of the longitudinal frame 61. The overall height fc of the crawler device including the crawler belt is set smaller than a gap space (for example, 20 mm) of an object that the crawler device is to be applied to. The height fc is set larger by, for example, about 3 mm compared to the height fh. Note that the other components are mounted within the height of the longitudinal frame 61.

The drive motor 7 and the driving force transmission mechanism 71 for transmitting the driving force of the motor 7 to the drive pulley 42 for driving the crawler belt 4 are disposed between the longitudinal frame 63 (shown by the broken line) and the longitudinal frame 62 positioned in the middle of the longitudinal frames 61, 63 (see FIG. 5C). The drive pulley 42 and the idler pulley 43 are provided at both ends of the guide 5 as shown in the C-C cross sectional view of FIG. 5C. The crawler belt 4 is entrained around these two pulleys 42, 43. Toothed pulleys are used for these two pulleys, and a toothed belt is also used for the crawler belt 4. The timing belt is thus used.

The B-B cross-section of FIG. 5D shows the situation the yoke 2 is disposed on the backsides of the magnets 1c, 1d and the return portion 4b of the crawler belt 4 runs behind the yoke, and shows the situation the surface of the drive portion 4a of the crawler belt 4 protrudes from the upper surfaces of the longitudinal frames 61, 62, 63, in other words, the components other than the crawler belt are mounted within the height of the frames.

The magnetically-attracting crawler moving device 100 is a crawler device that travels while magnetically attracting, by the source device of magnetic force 3 producing a strong magnetic field, to the steel object to which the crawler device is to attract, with the crawler belt being put in contact with the object. The upper surfaces of the magnets are positioned lower than the drive portion 4a of the crawler belt 4, so that the crawler device can travel with the magnets being in no contact with a surface of the object to which the crawler device is to attract.

In the magnetically-attracting crawler moving device 100, other components are mounted within the height of the frames with only drive portion 4a of the crawler belt being slightly protruding, as described above. In other words, each component is protected by the frames from banking against a protrusion or the like of the object to which the crawler device is to attract. In addition, a thin plate may be provided if necessary to protect the surface of the traveling mechanism.

As described above, the magnetically-attracting crawler moving device 100 according to Embodiment 1 is configured to have such a flame height to be able to enter into a narrow gap space of less than about 20 mm to travel therein.

Moreover, the combination of the magnets and the yoke forms a magnetic path with the magnetic object on which the crawler device travels to concentrate the magnetic flux toward the drive portion of the crawler belt, whereby the source device of magnetic force 3 generates a strong attracting force. Furthermore, since by disposing the yoke, the ratio of the flux generated by the magnets and passing through the ferromagnetic yoke made such as of iron increases and the flux density becomes very small in the other direction path, a component, such as the motor, affected by magnetism can be adjacently arranged without providing a magnetic shield (see FIG. 3).

The crawler belt can be made thin and lightweight because it is not a magnet-type crawler belt (refer to Patent Document 5) and is guided to run on the low-friction sliding surface without using idler pulleys, thus, providing a thin sliding guide structure without needing a complicated structure.

Figures 7A, 7B:
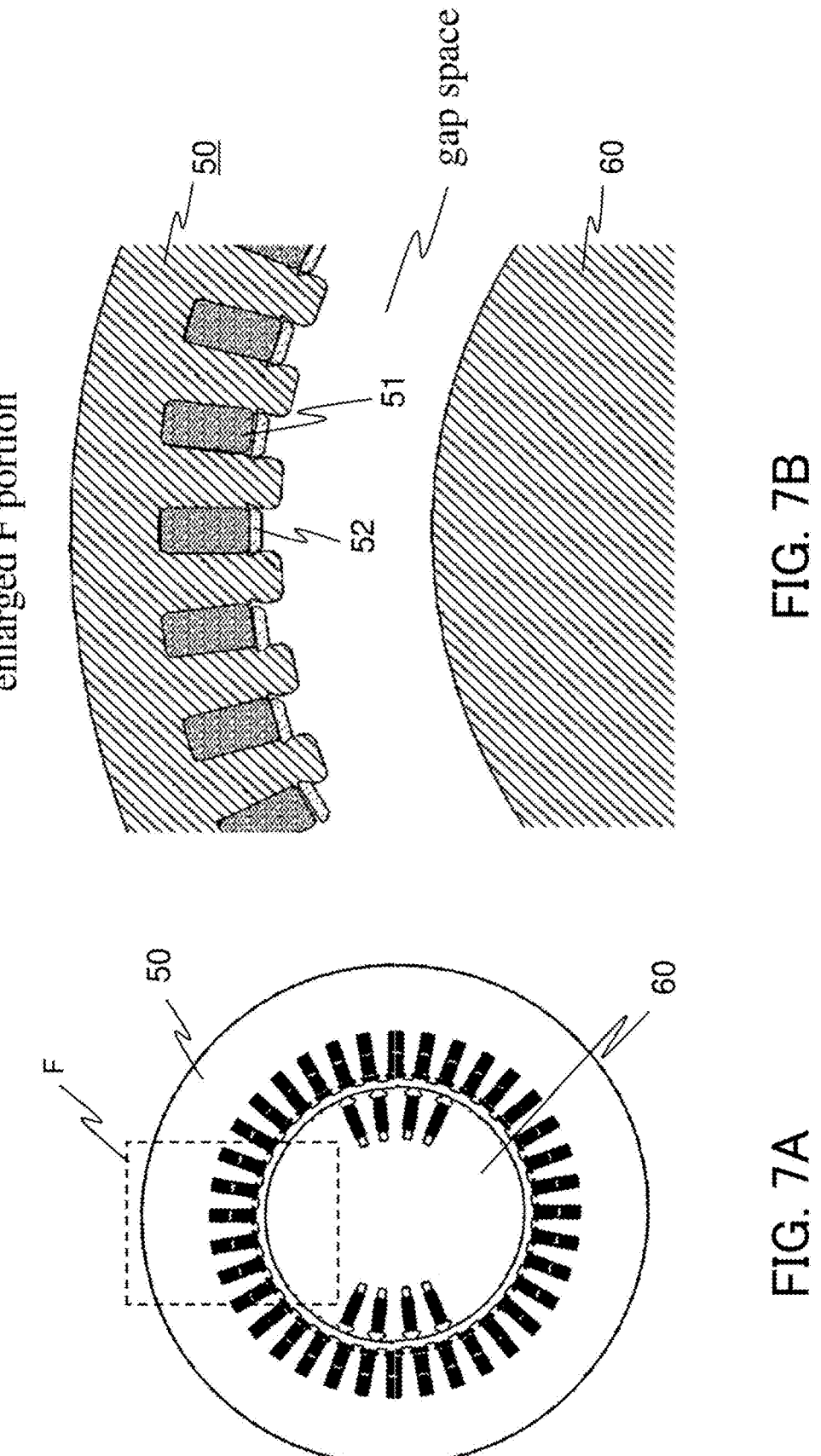
FIGS. 7A and 7B are cross-sectional views for explaining an application example of the magnetically-attracting crawler moving device according to Embodiment 1.

As described above, the height of about 20 mm enables the magnetically-attracting crawler moving device to travel in a narrow gap space (see FIG. 7B) between the rotor 60 and the iron stator 50 of a power plant generator shown in FIGS. 7A and 7B to check and examine the conditions of the coils 51, the resin members 52, and/or the like (the details are described later). In addition, the magnetically-attracting crawler moving device according to Embodiment 1 is also applicable to check of a bridge because its bridge girders are generally made of steel beams, thus being able to design properly a magnetically-attracting crawler moving device that enters into a gap space between the pier and the floor of the bridge to perform the check. It is goes without saying that the crawler device can perform the check while traveling on a surface portion not a gap space.

Embodiment 2

Figure 8:
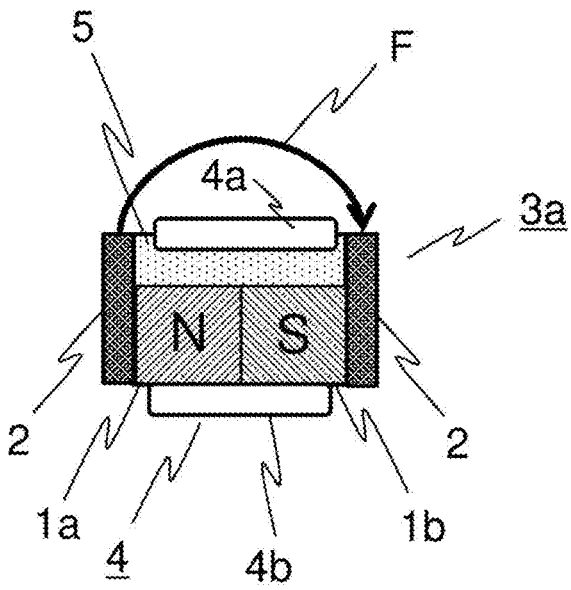
FIG. 8 is a cross-sectional view showing another configuration according to Embodiment 2, of the source device of magnetic force of the magnetically-attracting crawler moving device.

An example of a configuration of a source device of magnetic force 3a according to Embodiment 2 is shown in FIG. 8. The configuration other than the source device of magnetic force 3a is basically the same as with Embodiment 1; hence, description thereof is omitted here.

The source device of magnetic force is configured with a magnet composed of a pair of magnetic poles 1a, 1b and yokes 2 arranged respectively on the outsides of the magnet, and the guide 5 disposed on the upper surface of the pair of magnetic poles 1a, 1b; and the drive portion 4a of the crawler belt 4 runs on the surface of the guide while sliding on the surface of the guide and the return portion 4b runs behind the pair of magnetic poles 1a, 1b.

This configuration concentrates the magnetic flux across the right and the left yokes and generates a very strong magnetic force on the upper surface side of the drive portion 4a of the crawler, thus being able to generate a large force for attracting to the object to which the crawler device is to attract. Additionally, by mounting the yokes in the notches formed in the right and left frames (see FIGS. 5A, 5B, 5C, and 5D), the crawler device can be made compact.

Embodiment 3

Figures 9A, 9B:
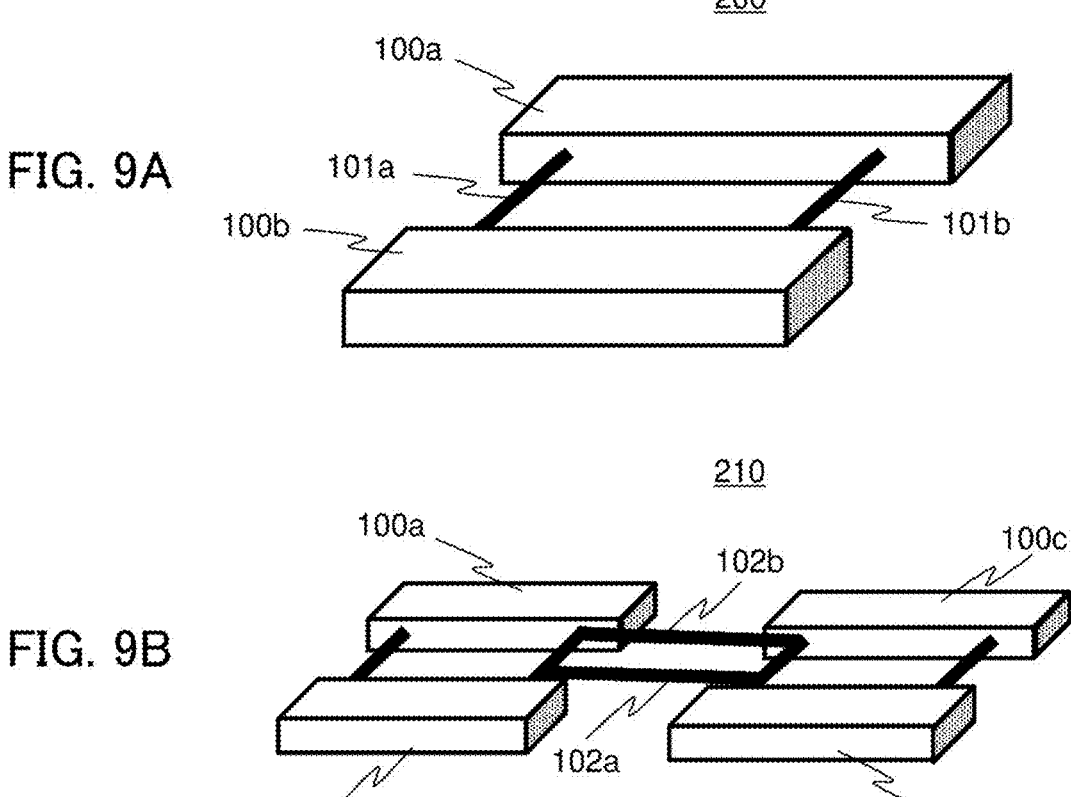
FIGS. 9A and 9B are views showing examples of a multi-connected magnetically-attracting crawler moving device according to Embodiment 3.

A multi-connected magnetically-attracting crawler moving device according to Embodiment 3 is shown in FIGS. 9A and 9B. FIG. 9A shows the multi-connected (parallel connection type) magnetically-attracting crawler moving device 200 that is constituted with two magnetically-attracting crawler moving devices 100a, 100b parallel connected with each other by transverse connecting members 101a, 101b. Since the magnetically-attracting crawler moving device 100 described in Embodiment 1 can be used as the magnetically-attracting crawler moving devices 100a and the magnetically-attracting crawler moving device 100b, description of the two crawler devices is omitted. Since the two traveling mechanisms including the crawler belts configured to travel in the direction parallel to each other, the travel direction of the multi-connected magnetically-attracting crawler moving device 200 can be varied by independently controlling the rotation speeds of the right and the left crawler belts.

FIG. 9B shows a multi-connected magnetically-attracting crawler moving device (parallel tandem connection type) 210 that is constituted with four of the magnetically-attracting crawler moving devices 100a, 100b and magnetically-attracting crawler moving devices 100c, 100d connected in parallel and series by transverse connecting members 101a, 101b and longitudinal connecting members 102a, 102b. Since the magnetically-attracting crawler moving device 100 described in Embodiment 1 can be used as the four magnetically-attracting crawler moving devices 100a, 100b, 100c, 100d, description of the four is omitted. The parallel-tandem-type multi-connected magnetically-attracting crawler moving device 210 can further increase the capacity of mounting instruments.

As described above, by multi-connecting the magnetically-attracting crawler moving devices 100 in parallel and/or series, the crawler device can be made large as a whole, so that a large instrument can be also mounted. Moreover, the parallel configuration also enables the traveling direction to be varied by independently controlling the rotation speeds of the right and the left crawler belts. Thus, the multi-connected magnetically-attracting crawler moving device can be controlled to travel straightly even under a large influence of the gravity, for example, traveling on a celling surface and the like.

Moreover, although the crawler device is liable to slip down due to the influence of gravity when traveling horizontally on a sloping wall by the magnetically attracting force, the crawler device is able to keep straight traveling. Furthermore, the multi-connection allows the mounting capacity, such as mounting various kinds of sensors and the likes, to be increased.

Embodiment 4

Figure 10:
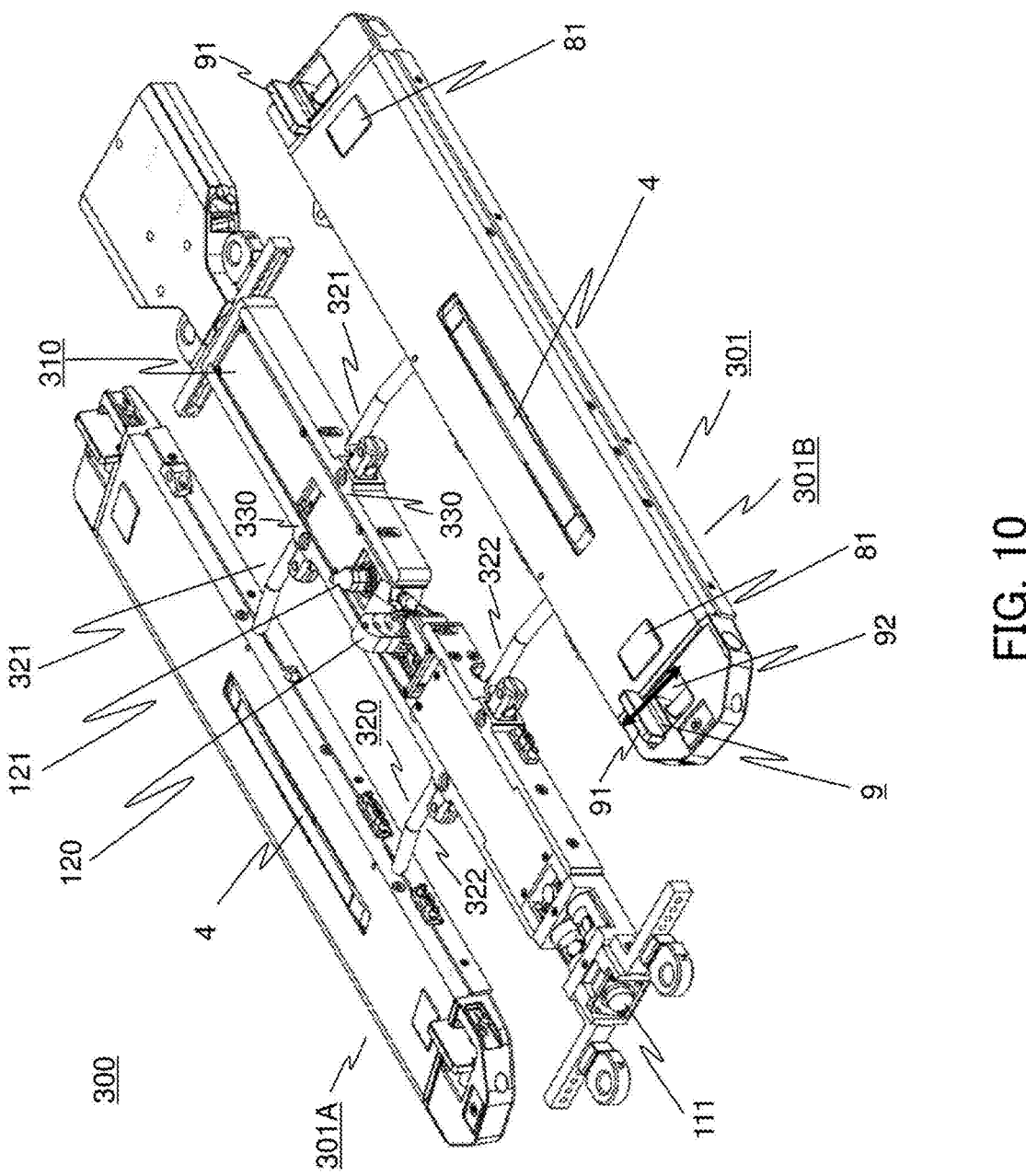
FIG. 10 is a perspective view for explaining an application example of a magnetically-attracting crawler moving device according to Embodiment 4.

An example of application of a magnetically-attracting crawler moving device 301 is a generator inspection robot 300 shown in FIG. 10. The generator inspection robot 300 is configured with an inspection robot body 310, the magnetically-attracting crawler moving devices 301A, 301B arranged at the right and left of the inspection robot body 310, and connecting legs 320 for connecting the inspection robot body 310 to each of the respective magnetically-attracting crawler moving devices 301A, 301B.

To be more specific, the inspection robot body 310 is connected to the magnetically-attracting crawler moving devices 301A, 301B by the connecting legs 320 constituted with front legs 321 and rear legs 322 (total four legs), respectively, as shown in FIG. 10.

Figure 11:
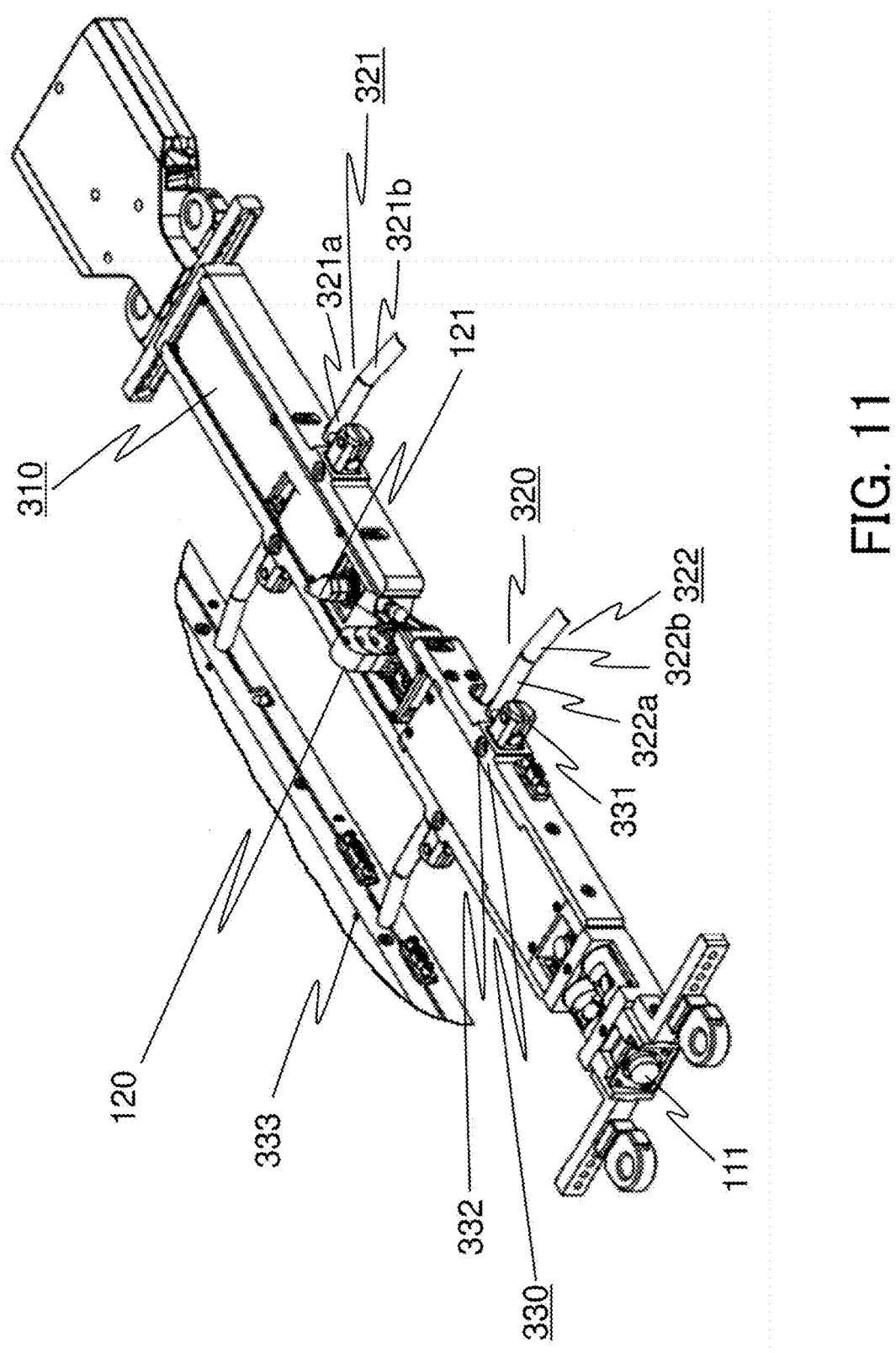
FIG. 11 is a partially enlarged view of FIG. 10.

The front legs 321 each are made up of a robot-body-side front leg 321a provided proximal to the inspection robot body 310 and a crawler-device-side front leg 321b provided proximal to the magnetically-attracting crawler moving device, as shown in FIG. 11. Similarly, the rear legs 322 each are made up of a robot-body-side rear leg 322a provided proximal to the inspection robot body 310 and a crawler-device-side rear leg 322b provided proximal to the magneti-cally-attracting crawler moving device.

The mounting angles and positions of the front legs and the rear legs each are adjustably set by leg rotation adjusting shafts 331 and leg up and down adjusting parts 332 provided to leg adjusters 330. In addition, the crawler-device-side legs are accommodated in leg extending and retracting housings 333 provided to the crawler devices.

Since the connecting legs are configured as described above, the relative positions of the inspection robot body 310 and the magnetically-attracting crawler moving devices 301 connected at the right and left thereof are flexibly adjusted, so that the generator inspection robot can be moved as a whole to a desired place. Hence, the generator inspection robot 300 integrated as a whole with the inspection robot body 310, the magnetically-attracting crawler moving devices 301, and the connecting legs 320 can check a generator, an inspection target by entering in the gap space between the stator and the rotor thereof.

The above is further described in detail with reference to FIG. 12. The cross-sectional view of FIG. 12 shows a situation of the integrated generator inspection robot 300 when it enters in the gap space between the rotor 60 and the stator 50 of the generator shown in the cross-sectional view of FIG. 7B.

The generator inspection robot 300 enters into the gap space between the stator 60 and the rotor 50 of the generator, the inspection target to check the generator while traveling the gap space.

Figure 12:
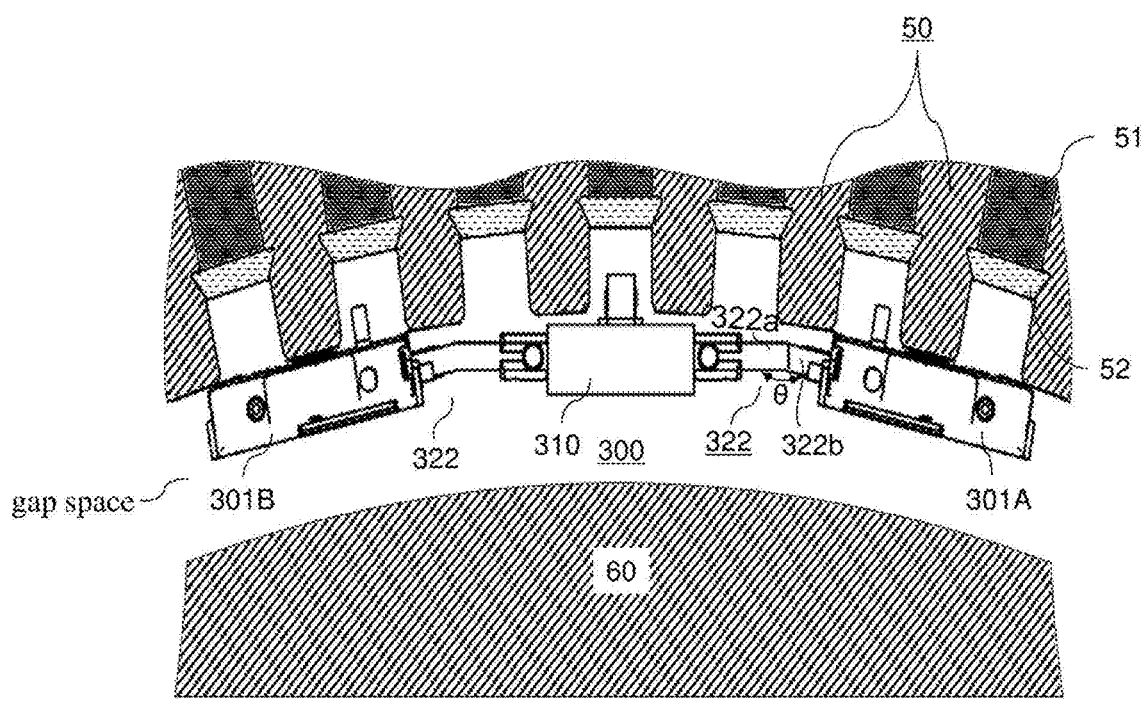
FIG. 12 is a cross-sectional view for explaining an application example of the magnetically-attracting crawler moving device according to Embodiment 4.

Specifically, as shown in FIG. 12, the inspection robot body 310 equipped with a check and/or an inspection instrument enters into the gap space including the grooves between the teeth of the stator 50 of the generator. The two magnetically-attracting crawler moving devices 301A, 301B are respectively connected to both sides of the inspection robot body 310 by the rear legs 322 one of the pair of the connecting legs. Thus, the generator inspection robot 300 integrated as a whole with the inspection robot body, the magnetically-attracting crawler moving devices, and the connecting legs enters in the gap space between the rotor and the stator of the generator, the check target and travels in the direction perpendicular to the sheet of FIG. 12 to check the generator.

The rear legs 322 each are made up of the robot-body-side rear legs 322a connected with the inspection robot body and the crawler-device-side rear legs 322b connected with the magnetically-attracting crawler moving device, and the robot-body-side rear legs 322a and the crawler-device-side rear legs 322b are connected to each other at an appropri-ately set angle θ (an obtuse angle in FIG. 12) to enter into the cylindrical gap space between the rotor and the stator of the generator, as shown in FIG. 12. The angle θ is appro-priately adjusted depending on the shape of a gap space (a cylindrical shape here).

In addition, a check and/or an inspection instrument can be mounted as required on the inspection robot body 310. In Embodiment 4, an imaging camera 111, an acceleration sensor 120 for hammering test, and a hammer 121 are mounted as an example (see FIG. 11). While the above expounds on the rear legs of the connecting legs, the same is true for the front legs of the connecting legs.

As described above, since the generator inspection robot 300 enters in the cylindrical gap space when checking the generator, the crawler-device-side legs and the robot-body-side legs are adjustably set to a predetermined angle θ to form a dog-leg shape so that the inspection robot body 310 and the right and left connected magnetically-attracting crawler moving devices 301A, 301B can travel smoothly through the gap space (see FIG. 12).

The robot-body-side legs are attracted via the leg adjuster 330 to the robot body so that the height and the width of the generator inspection robot 300 can be adjusted according to the size of a generator (see FIG. 11). Furthermore, the leg extending and retracting housings 333 for the crawler-device-side legs are provided to the chassis of the magneti-cally-attracting crawler moving devices 301A, 301B (see also FIG. 11)

The magnetically-attracting traveling mechanism accord-ing to Embodiment 4 is configured such that the magnetic flux of the magnets is concentrated toward the drive portion of the crawler belt for the crawler belt to be in contact with and for the yoke or the magnets to be non-contact with the object P to which the crawler device is to attract, thus being able to provide the device configuration that enables a crawler device to travel with a strong attracting force being kept (see FIG. 3). Moreover, the magnetically-attracting traveling mechanism according to Embodiment 4 have basi-cally only the thickness of the yoke and magnets and the height (thickness) of the drive portion of the crawler belt, thus being able to provide a compact magnetically-attracting crawler moving device that has a simple structure and suppresses its height.

The magnetically-attracting crawler moving device according to Embodiment 4 is a simple structured traveling device that provides the configuration such that the magnets and the crawler belt are interposed between the right and the left frames and the crawler belt slides on the guide for the device to attract the object P. The magnetic flux is concentrated toward the object to which the crawler device to increase the attracting force by combining the attracting magnets and the yokes. Moreover, the traveling performance is increased by employing for the belt guide an engineering plastic having a low sliding friction and wear resistance. Accordingly, a magnetically-attracting traveling device can be provided that is lightweight and has a simple structure and increased capacity of mounting an inspection and/or maintenance instruments.

As described above, in the magnetically-attracting crawler moving device according to Embodiments 1 to 4, since the notches are formed in the longitudinal frames to mount the source device of magnetic force, the crawler device can be made compact as a whole. Moreover, since the source device of magnetic force according to Embodiment 2 is configured such that the thin guide having a thickness fa (see FIG. 5D) is disposed on the upper surface of the magnet and the top ends of the yokes are exposed to the sides of the crawler belt to concentrate the magnetic flux from the yokes to the surface of the object to which the crawler device is to attract, the-attracting force can be generated sufficiently.

The magnetically-attracting crawler moving device according to Embodiments 1 to 4, since it can be configured to suppress the overall height of the crawler device, which the height fc (see FIG. 5B) to the drive portion of the crawler belt, by disposing the drive motor outside the frames, can travel in a narrower gap space. Moreover, since the magnetically-attracting crawler moving device is configured to concentrate the magnetic flux of the magnets generating the attracting force toward the drive portion of the crawler belt (toward the object side), even though the motor for driving the crawler belt is displaced adjacent to the attracting magnets, a malfunction of the motor can be prevented because the motor is less affected by the strong magnetic field of the magnets.

In addition, the magnetically-attracting crawler moving device according to Embodiments 1 to 3 can also be used alone as a field investigation device or an inspection device by mounting a sensor or the like. Moreover, the inspection robot according to Embodiments 4 can be made large as a whole by connecting in parallel and/or series a plurality of the magnetically-attracting crawler moving devices of Embodiment 4. Furthermore, in the case of parallel connection, the moving direction can be varied as a whole by independently controlling the rotation speeds of the right and the left crawler belts.

Although the present application describes various exemplary embodiments and implementations, it should be understood that various features and aspects and functionalities described in one or more of the individual embodiments are not limited to their applicability to the specific embodiment but instead can be applied alone or in various combinations to one or more of the embodiments. Therefore, numerous modifications that have not been exemplified are conceivable without departing from the technical scope disclosed in the specification of the present application. For example, at least one of the constituent components may be modified, added, or eliminated, and further at least one of the constituent components mentioned in at least one of the preferred embodiments may be selected and combined with the other constituent elements mentioned in another preferred embodiment.

REFERENCE NUMERALS

1, 1a, 1b, 1c, 1d: magnet;
2, 20: yokes;

3, 3A, 3B, 3a: source device of magnetic force;
4: crawler belt;
4a: drive portion;
4b: return portion;
5: guide;
6: frames;
7: motor;
10: magnetically-attracting traveling mechanism;
42, 43: pulley;
50: stator;
51: coils;
52: resin member;
60: rotor;
61, 62, 63: longitudinal frame;
64: transverse frames;
65: notches;
71: driving force transmission mechanism;
100, 100a, 100b, 100c, 100d, 301A, 301B: magnetically-attracting crawler mobbing device;
101a, 101b: transverse connecting members;
102a, 102b: longitudinal connecting members 102a, 102;
111: camera;
120: acceleration sensor;
121: hammer;
200: multi-connected magnetically-attracting crawler moving device (parallel connection type);
210: multi-connected magnetically-attracting crawler moving device (parallel and serial connection type);
300: generator inspection robot;
310: inspection robot body;
320: connecting legs;
321: front legs;
321a: robot-body-side front legs;
321b: crawler-device-side front legs;
322: rea legs;
322a: robot-body-side rear legs;
322b: crawler-device-side rear legs;
330: leg adjusters;
331: leg rotation adjusting shafts;
332: leg up and down adjusting parts; and
333: leg extending and retracting housings.

The invention claimed is:

1. A magnetically-attracting crawler moving device comprising:
   a source device of magnetic force including a pair of magnets each arranged such that polarities of magnets are opposite to each other and including a yoke disposed in contact with each magnet of the pair of magnets;
   a non-magnetic guide disposed so that different sides of the guide is in contact with each magnet of the pair of magnets and a bottom of the guide is in contact with the yoke, or the bottom is in contact with the pair of magnets and the different sides are in contact with the yoke; and
   a crawler belt rotationally running in non-contact with the source device of magnetic force and along the longitudinal direction of the guide.

2. The magnetically-attracting crawler moving device of claim 1, wherein the guide is made of engineering plastic, and the yoke is disposed to arrange the magnet pair apart from each other and the guide is disposed sandwiched between the magnet pair, and the crawler belt projects from the source device of magnetic force and the surface of the guide and rotationally runs while sliding on a surface of the guide.

3. The magnetically-attracting crawler moving device of claim 2, wherein the pair of magnets are configured in a combination such that the different-polarity magnet is arranged on the surface side and the magnet having a polarity different from the polarity of the surface-side magnet is arranged on the back side.

4. The magnetically-attracting crawler moving device of claim 3, wherein a plurality of the magnets is arranged along a running direction of the crawler belt.

5. The magnetically-attracting crawler moving device of claim 2, wherein a plurality of the magnets is arranged along a running direction of the crawler belt.

6. The magnetically-attracting crawler moving device of claim 2, wherein a plurality of longitudinal frames is provided parallelly to each other in the running direction of the crawler belt, and the crawler belt is disposed between neighboring two of the longitudinal frames, and the drive portion of the crawler belt projects from the longitudinal frames.

7. The magnetically-attracting crawler moving device of claim 1, wherein the pair of magnets are configured in a combination such that the different-polarity magnet is arranged on the surface side and the magnet having a polarity different from the polarity of the surface-side magnet is arranged on the back side.

8. The magnetically-attracting crawler moving device of claim 7, wherein a plurality of the magnets is arranged along a running direction of the crawler belt.

9. The magnetically-attracting crawler moving device of claim 1, wherein a plurality of the magnets is arranged along a running direction of the crawler belt.

10. The magnetically-attracting crawler moving device of claim 1, wherein a plurality of longitudinal frames is provided parallelly to each other in the running direction of the crawler belt, and the crawler belt is disposed between neighboring two of the longitudinal frames, and the drive portion of the crawler belt protrudes from the longitudinal frames.

11. The magnetically-attracting crawler moving device of claim 10, wherein the two longitudinal frames have notches, and the source device of magnetic force is mounted using the notches.

12. The magnetically-attracting crawler moving device of claim 11, wherein the pair of magnets are separately mounted in the notches formed in the two neighboring longitudinal frames, respectively.

13. The magnetically-attracting crawler moving device of claim 10, wherein the crawler belt is driven by a motor sandwiched between another longitudinal frame provided outside, in parallel to and outside the longitudinal frames including notches and one of the longitudinal frames, and mounted within the heights of these longitudinal frames.

14. A multi-connected magnetically-attracting crawler moving device comprising: a plurality of the magnetically-attracting crawler moving devices of claim 1 connected in parallel or series.

15. A magnetically-attracting crawler moving device comprising:

a source device of magnetic force including a pair of magnets each arranged such that polarities of magnets are opposite to each other and a yoke pair disposed sandwiching the pair of magnets, a non-magnetic guide made of engineering plastic, having a bottom disposed in contact with an upper surface of the pair of magnets, and sandwiched between the yoke pair, and a crawler belt rotationally running in non-contact with the source device of magnetic force and along the longitudinal direction of the guide, wherein the crawler belt projects from the source device of magnetic force and the surface of the guide and runs rotationally while sliding on a surface of the guide.

16. The magnetically-attracting crawler moving device of claim 15, wherein the pair of magnets are configured in a combination such that the different-polarity magnet is arranged on the surface side and the magnet having a polarity different from the polarity of the surface-side magnet is arranged on the back side.

17. The magnetically-attracting crawler moving device of claim 16, wherein a plurality of the magnets is arranged along a running direction of the crawler belt.

18. The magnetically-attracting crawler moving device of claim 15, wherein a plurality of the magnets is arranged along a running direction of the crawler belt.

19. The magnetically-attracting crawler moving device of claim 15, wherein a plurality of longitudinal frames is provided parallelly to each other in the running direction of the crawler belt, and the crawler belt is disposed between neighboring two of the longitudinal frames, and the drive portion of the crawler belt projects from the longitudinal frames.

20. A generator inspection robot comprising:

a magnetically-attracting crawler moving device including:

a source device of magnetic force including a pair of magnets each arranged such that polarities of magnets are opposite to each other and including a yoke disposed in contact with each magnet of the pair of magnets;

a non-magnetic guide disposed so that different sides of the guide is in contact with each magnet of the pair of magnets and a bottom of the guide is in contact with the yoke, or the bottom is in contact with the pair of magnets and the different sides are in contact with the yoke; and a crawler belt rotationally running in non-contact with the source device of magnetic force and along the longitudinal direction of the guide; and an inspection robot body equipped with a check and/or an inspection instrument;

connecting legs adapted to connect the at least one crawler device with the inspection robot body so as to be able to adjust relative positions of the at least one crawler device and the inspection robot body, wherein the at least one crawler device, the inspection robot body, and the connecting legs are integrated to be able to travel as the whole in a gap space between a stator and a rotator of a generator.

\* \* \* \* \*